(12) United States Patent
Nagasawa et al.

(10) Patent No.: US 6,610,372 B2
(45) Date of Patent: Aug. 26, 2003

(54) METHOD OF CURING A MIXTURE COMPRISING AN IONIZING RADIATION CURING RESIN, AND SURFACE MODIFYING TECHNIQUE

(75) Inventors: Atsushi Nagasawa, Tsukuba (JP); Takahiro Kitano, Tsukuba (JP); Keiji Kubo, Tsukuba (JP); Katsuya Fujisawa, Tsukuba (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/076,495

(22) Filed: Feb. 19, 2002

(65) Prior Publication Data
US 2002/0155228 A1 Oct. 24, 2002

(30) Foreign Application Priority Data
Feb. 19, 2001 (JP) ........................................ 2001-042073

(51) Int. Cl.$^7$ .................................................. C08F 2/48
(52) U.S. Cl. .................... 427/508; 427/385.5; 427/487; 427/558; 427/559; 427/595
(58) Field of Search ................................ 427/508, 558, 427/559, 385.5, 595, 487

(56) References Cited

FOREIGN PATENT DOCUMENTS

JP 11-33484 2/1999

*Primary Examiner*—Bernard Pianalto
(74) *Attorney, Agent, or Firm*—Oblon, Spivak, McClelland, Maier & Neustadt, P.C.

(57) ABSTRACT

This invention aims to make it possible to obtain curing surfaces with different surface free energies, and to provide a method of curing an ionizing radiation curing resin composition which can be used as a coating material. Further, it aims to provide a surface modification method which permits surfaces of different surface free energy to be obtained. The above object is achieved by a method of curing a mixture comprising an ionizing radiation curing resin, characterized in that at least part of a mixture comprising 0.01–10 weight parts of a compound (b) having a surface free energy not exceeding 25 mN/m relative to 100 weight parts of an ionizing radiation curing resin composition (a) having a surface free energy of at least 30 mN/m, is cured by irradiating it with ionizing radiation in contact with a medium having a surface free energy higher than that of the ionizing radiation curing resin composition (a).

16 Claims, 1 Drawing Sheet

METHOD OF CURING A MIXTURE COMPRISING AN IONIZING RADIATION CURING RESIN, AND SURFACE MODIFYING TECHNIQUE

BACKGROUND OF THE INVENTION

1. Field of the Invention

The present invention relates to method of curing a mixture comprising an ionizing radiation curing resin, and a surface modifying technique.

2. Description of the Related Art

It is well known that solid surfaces having a low surface free energy exhibit high water repellence and oil repellence. Silicone oil or fluorine-type compounds are typical examples of substances having a low surface free energy, and are used as materials for modifying plastic, wood, fiber and metal surfaces (Japanese Patent Laid-Open 2000-191911, Japanese Patent Laid-Open Hei 5-117546 and many other references). Due to their characteristics, they are used to prevent snow building up on antenna or electrical wiring, to make it easier for ships to navigate by lowering resistance, and to prevent adhesion of water droplets or misting on car windows.

Solid surfaces having water repellence and oil repellence are used in various applications as described above, however as solid surfaces with water repellence and oil repellence also have reduced adhesion to adhesives and ink wettability, etc., decline, sufficient strength can no longer be obtained when they are stuck to other materials, and printing on them is difficult.

If the surface free energy of water-repellent surfaces and oil-repellent surfaces is partially increased, the part of the surface with the higher surface free energy can be modified to be hydrophilic or lipophilic, so adhesive properties and printing properties are improved, and the surfaces can be employed as planographic plate which make full use of differences in the tendency of ink to wet onto a solid surface. For example, by varying the surface free energy of an original plate wherein a photosensitive resin having hydrophobic properties is coated onto a hydrophilic surface comprising an aluminium plate, planographic plate can be performed using a planographic plate obtained by forming an image part with ink and a non-image part without ink. When the photosensitive resin is a negative photosensitive resin, the region irradiated by ionizing radiation becomes the image part, and when a positive photosensitive resin is used, the region irradiated by ionizing radiation becomes the non-image part. The surface modification of this image part and non-image part may be realized by developing and removing the photosensitive resin.

In Japanese Patent Laid-Open Hei 10-114888, an example is given where, by irradiating a super-water repellent surface having a contact angle with water of 150° or more with ionizing radiation, a hydrophilic surface is obtained having a contact angle with water of 70° or less which can be used as a printing plate. In Japanese Patent Laid-Open 2000-87016, by irradiating a super-water repellent surface having a contact angle with water of 150° or more, a material is obtained having a contact angle with water of 10° or less.

However, the above planographic plate and materials which were changed from super-water repellent to hydrophilic surfaces are all solids, and as they have little miscibility in solvents, it was difficult to apply them as coating agents.

SUMMARY OF THE INVENTION

It is therefore an object of this invention to make it possible to obtain curing surfaces with different surface free energies, and to provide a method of curing an ionizing radiation curing resin composition which can be used as a coating material. It is a further object of this invention to provide a surface modification method which permits surfaces of different surface free energy to be obtained.

According to first aspect of the invention, which resolves the aforesaid problems, is a method of curing a mixture comprising an ionizing radiation curing resin, characterized in that at least part of a mixture comprising 0.01–10 weight parts of a compound (b) having a surface free energy not exceeding 25 mN/m relative to 100 weight parts of an ionizing radiation curing resin composition (a) having a surface free energy of at least 30 mN/m, is cured by irradiating it with ionizing radiation in contact with a medium having a surface free energy higher than that of the ionizing radiation curing resin composition (a).

According to second aspect of the invention is the above method of curing a mixture comprising an ionizing radiation curing resin composition, wherein the medium having a surface free energy higher than that of the ionizing radiation resin curing composition (a), is water.

According to third aspect of the invention is a method of modifying a surface, comprising a step wherein a mixture comprising 0.01–10 weight parts of a compound (b) having a surface free energy not exceeding 25 mN/m relative to 100 weight parts of an ionizing radiation curing resin composition (a) having a surface free energy of at least 30 mN/m is coated on the surface of a substrate, and a step wherein the mixture is partially cured by irradiating it with ionizing radiation in contact with a medium having a surface free energy lower than that of the compound (b), and the remaining, uncured part is cured by irradiating it with ionizing radiation in contact with a medium having a surface free energy higher than that of the ionizing radiation curing resin composition (a).

According to fourth aspect of the invention is a method of modifying a surface, comprising a step wherein a mixture comprising 0.01–10 weight parts of a compound (b) having a surface free energy not exceeding 25 mN/m relative to 100 weight parts of an ionizing radiation curing resin composition (a) having a surface free energy of at least 30 mN/m is coated on the surface of a substrate, and a step wherein the mixture is partially cured by irradiating it with ionizing radiation in contact with a medium having a surface free energy higher than that of the ionizing radiation curing resin composition (a), and the remaining, uncured part is cured by irradiating it with ionizing radiation in contact with a medium having a surface free energy lower than that of the compound (b).

According to fifth aspect of the invention is the above method of modifying a surface, wherein the surface free energy after curing the part that was cured in contact with a medium having a surface free energy higher than that of the ionizing radiation curing resin composition (a), is higher by at least 5 mN/m than the part that was cured by irradiating it with ionizing radiation in contact with a medium having a surface free energy lower than that of the compound (b).

According to sixth aspect of the invention, is a method of modifying a surface comprising a step wherein a mixture comprising 0.01–10 weight parts of a compound (b) having a surface free energy not exceeding 25 mN/m relative to 100 weight parts of an ionizing radiation curing resin composition (a) having a surface free energy of at least 30 mN/m is coated on the surface of a substrate, and a step wherein a medium having a surface free energy higher than that of the ionizing radiation curing resin composition (a) is made to adhere partially to the mixture on the surface of the substrate, and the mixture is cured by irradiating it with ionizing radiation in contact with a medium having a surface free energy lower than that of the compound (b).

According to seventh aspect of the invention, is the above method of modifying a surface, wherein the surface free energy after curing the part wherein a medium having a surface free energy higher than that of the ionizing radiation curing resin composition (a) was made to adhere, is higher by at least 5 mN/m than the part wherein the medium was not made to adhere.

Herein, the value of the surface free energy in the specification is the value at temperature 20° C., relative humidity 50 percent, and measured by the method described below.

There are various methods for measuring the surface free energy of a liquid, but in this specification, the values measured by the Wilhelmy method at a temperature of 20° C. and a relative humidity of 50 percent were used as the surface free energy. The measuring principle of the Wilhelmy method is as follows. As shown in FIG. 1, a plate 2 is suspended from one arm of a balance 1, one end is immersed in a liquid 3 to be measured, a suitable load 4 is attached to the other end and the balance 1 is adjusted. In addition to gravity and buoyancy, the plate 2 is also subject to a force in the downward direction from the measurement liquid 3, so the following equation (1) may be written for the equilibrium state:

Load 4=Weight of plate 2−Buoyancy of plate 2+Force from liquid surface (1)

As the force due to the liquid surface is equivalent to the surface tension (=surface free energy of the liquid), the surface free energy of the liquid can be obtained by measuring the force due to the liquid surface. The material of the plate 2 may be platinum or glass, etc., and as the surface free energy does not change, it may be a material which is not corroded by the measurement liquid 3. In the measurements according to the specification, platinum is used as the material of the plate 2.

The surface free energy of the solid cannot be measured directly, but the surface free energy can be found using various types of liquid known in the art. A liquid drop on a solid surface has the cross-sectional shape shown in FIG. 2. In the figure, a contact angle 9 is an angle subtended by a tangent 8 to the liquid 6 and the side of the surface of the solid 5 in contact with the liquid 6, at an intersection point 7 between the surface of the liquid 6 on the surface of the solid 5, and the surface of the solid 5. Let this angle be θ. The following equation (2) (Young's equation) is then satisfied due to the equilibrium conditions at the intersection point 7:

$$Y_S = Y_{SL} + Y_L \cos\theta \quad (2)$$

Here, $Y_S$ is the surface free energy of the solid, $Y_L$ is the surface free energy of the liquid, and $Y_{SL}$ is the surface free energy of the solid/liquid interface.

The surface free energy Y is represented by the sum of the dispersion force component $Y^a$, polar force component $Y^b$ and hydrogen bond force component $Y^c$, so the following assumption (3) can be made regarding the surface free energy of the solid/liquid interface $Y_{SL}$:

$$Y_{SL} = Y_S + Y_L - 2(Y_S^a Y_L^a)^{1/2} - 2(Y_S^b Y_L^b)^{1/2} - 2(Y_S^c Y_L^c) \quad 3)$$

Therefore, if the value ? of the contact angle 9 is found for three or more liquids having different surface free energies under the conditions of temperature 20° C. and relative humidity 50%, $Y_S^a$, $Y_S^b$, $Y_S^C$ can be deduced by solving the equation with three unknowns derived from equation (2) and equation (3), and the surface free energy of the solid $Y_S$ can be found as their sum.

DETAILED DESCRIPTION OF THE INVENTION

Figure 1:
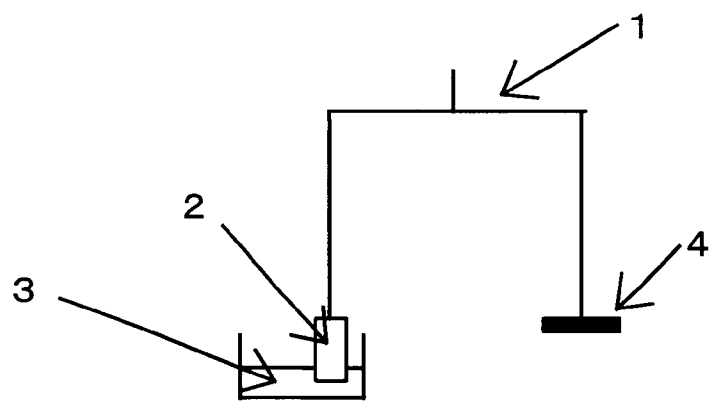
FIG. 1 is a diagram describing the Wilhelmy method.
Figure 2:
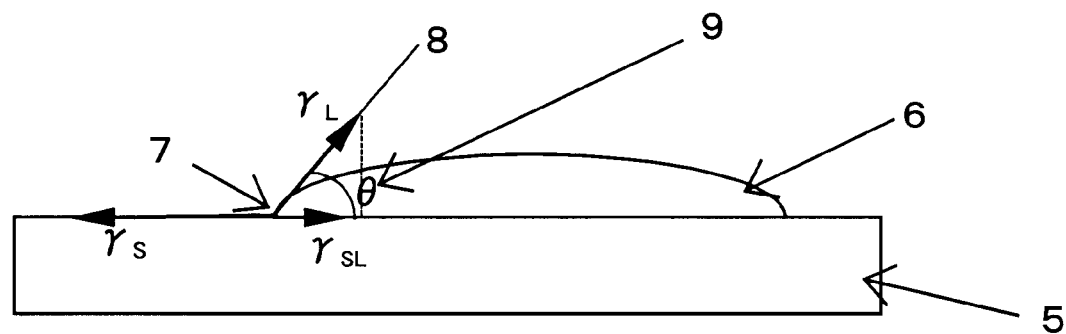
FIG. 2 is a diagram describing a method for measuring the surface free energy of a solid.

This invention will now be described in detail. In the method of curing a mixture comprising an ionizing radiation curing resin according to this invention, a mixture is used comprising the compound (b) of low surface free energy described later which is added to the ionizing radiation curing resin composition (a) described later. The surface free energy of the ionizing radiation curing resin composition (a) used to solve the problem of this application is at least 30 mN/m and preferably at least 40 mN/m. The surface free energy of the compound (b) does not exceed 25 mN/m, and preferably does not exceed 20 mN/m.

The inventors discovered that, by curing a mixture comprising the above ionizing radiation curing resin composition (a) and the compound (b) in contact with media of different surface free energies, it was possible to obtain surfaces of different surface free energies. Hence, whereas the surface free energy of the surface of the cured substance was low when the curing was performed in contact with a medium of low surface free energy, the surface free energy of the surface of the cured substance was found to increase when the curing was performed in contact with a medium of high surface free energy.

The above surface modification may be postulated to occur by the following mechanism. The interface between the mixture (hereafter referred to as the curing mixture) of the ionizing radiation curing resin composition (a) and the compound (b), and the medium, becomes stable from the energy viewpoint when the difference between their surface free energies is a minimum, and as the compound (b) in the curing mixture has a lower surface free energy than that of the ionizing radiation curing resin composition (a), when curing is performed in contact with a medium of low surface free energy, as the compound (b) is present in the interface, a stable state is achieved. Conversely, when curing is performed in contact with a medium of high surface free energy, the presence of the ionizing radiation curing resin composition (a) gives a more stable state from the energy viewpoint than if the compound (b) was present in the interface, so the compound (b) is no longer present in the interface. In other words, when the ionizing radiation curing resin composition (a) is not cured, a phase transition occurs due to the difference in the medium which is in contact. Therefore, by irradiating the curing mixture with ionizing radiation in contact with media of different surface free energies, surfaces of different surface free energy can be obtained by solidifying the state at the interface.

Further, when this curing mixture is not yet cured, the above phase transition is reversible. Therefore, if the curing mixture is coated on a substrate surface and a surface modification is performed to obtain a region having a high surface free energy and a region having a low surface free energy, a region of high surface free energy can first be formed selectively and the remainder modified to a region of low surface free energy, or conversely, a region of low surface free energy can first be formed selectively and the remainder modified to a region of high surface free energy.

The medium of high surface free energy may be water or a higher alcohol such as glycerin, and the medium of low surface free energy may be atmosphere or an inert gas such as helium or argon, but the invention is not limited to these.

As atmosphere may be used for the medium of low surface free energy and water may be used for the medium of high surface free energy, the surface modifying method of this invention is effective from the viewpoint of cost and environmental protection.

The compound (b) having a surface free energy of 25 mN/m or less in this invention may be a silicon-containing polymer compound, for example a silicone oil such as polydimethylsiloxane or a modified silicone oil wherein the side chain or end group of the silicone oil is modified by an amino group or an epoxy group, an alkoxysilane such as tetramethoxysilane or phenyltrimethoxysilane, or a fluorine-containing (polymer) compound such as a fluoroalkylsilane or a polymer compound containing a trifluoroalkyl group. However, the invention is not limited to these compounds.

The ionizing radiation curing resin composition (a) used for this invention mainly comprises a polymerizable monomer and/or oligomer, but if necessary, may also contain other components such as an ionizing radiation polymerization initiator (however, the above compound (b) having a surface free energy of 25 mN/m or less is excluded). The polymerizable monomer and oligomer is a compound which can be polymerized by ionizing radiation. In general, an ethylenic unsaturated compound having a surface free energy of 30 mN/m or higher and at least one ethylenic double bond in the molecule can be used, but if necessary, an epoxy or oxetane compound capable of undergoing cation polymerization when irradiated by ionizing radiation can also be added.

The ethylenic unsaturated compound which can be polymerized by ionizing radiation used in this invention is a monofunctional (meth)acrylate monomer such as (meth) acrylic acid, methyl (meth)acrylate, ethyl (meth)acrylate, propyl (meth)acrylate, n-butyl (meth)acrylate, t-butyl (meth) acrylate, 2-ethylhexyl (meth)acrylate, benzyl (meth) acrylate, glycidyl (meth)acrylate, tetrahydrofurfuryl (meth) acrylate and 2-hydroxyethyl (meth)acrylate; a vinyl compound such as N-vinyl pyrrolidone, N-vinyl imidazole, N-vinyl caprolactam, styrene, a-methylstyrene, vinyltoluene, allyl acetate, vinyl acetate, vinyl propionate or vinyl benzoate, or a bifunctional (meth)acrylate monomer such as 1,4-butane diol di(meth)acrylate, 1,6-hexane diol di(meth)acrylate, 1,9-nonane diol di(meth)acrylate, ethylene glycol di (meth) acrylate and polyethylene glycol di (meth) acrylate; and polyfunctional (meth)acrylate monomers such as trimethylolpropane tri(meth)acrylate, pentaerythrytol tri (meth)acrylate, pentaerythrytol tetra(meth)acrylate, pentaerythrytol penta(meth)acrylate, dipentaerythrytol hexa (meth)acrylate, triallyl cyanurate, triallyl isocyanurate and 1,3,5-tri(meth)acryloyl hexahydro-s-hydrazine, one or more of these compounds being used. In the above, "(meth)acrylic acid" refers to "acrylic acid" and "methacrylic acid", "(meth)acrylate" refers to "acrylate" and "methacrylate", and "(meth)acryloyl" refers to "acryloyl" and "methacryloyl".

An ionizing radiation polymerization initiator may also be added if necessary. The ionizing radiation polymerization initiator may for example be 2,2-dimethoxy-2-phenylacetone, acetophenone, benzophenone, xanthofluoroenone, benzaldehyde, anthraquinone, 1-(4-isopropylphenyl)-2-hydroxy-2-methylpropane-1-one, 1-hydroxy-cyclohexyl-phenyl-ketone, 2,4-diethylthioxanthone, camphor quinone, and 2-methyl-1-[4-(methylthio) phenyl]-2-morpholino propane-1-one.

Moreover, if necessary, organic solvents such as acetone, ethanol, methanol, isopropyl alcohol, hexane, ethyl acetate, chloroform, carbon tetrachloride, tetrahydrofuran, diethyl ether, methyl ethyl ketone, toluene and benzene may be used as diluents for the curing mixture.

The substrate which is coated with the curing mixture for the purpose of surface treatment may be a molded product such as a plastic, film, sheet or injection-molded body, or a product comprising various materials such as wood, metal, paper or ceramics.

According to this invention, as described above, it is possible to selectively modify a surface to form a region of high surface free energy and a region of low surface free energy. Therefore, by coating ink selectively on a cured surface which has been selectively modified, the ink may be coated only in the region having a high surface free energy which has good wettability, whereas the ink rejects the region having a low surface free energy with poor wettability and is not coated thereon. By using this method, and controlling the region which is irradiated by the ionizing radiation, it is possible to manufacture an image part and a non-image part, and this phenomenon may be used as a planographic plate. Further, when another material is made to adhere to a substrate whereof the surface has been modified, a region having a high surface free energy may be formed in a part where it is desired to stick a material on a film, and so other materials may be firmly attached without peeling of the film.

EXAMPLES

This invention will now be described in detail by way of specific examples, but the invention should not be construed as being limited thereby.

Example 1

60 weight parts of dipentaerythrytol hexa-acrylate "KAYARAD DPHA" (trade name; product by NIPPON KAYAKU CO., LTD.), 40 weight parts of ethylene oxide-modified triacrylic isocyanurate "Aronix M-315" (trade name; product by TOAGOSEI CO., LTD.), 1 weight part of 2,4-diethylthioxanthone "KAYACURE DETX-S" (trade name; product by NIPPON KAYAKU CO., LTD.) and 3 weight parts of 2-methyl-1-[4-(methylthio) phenyl]-2-morpholino propane-1-one "Irgacure 907" (trade name; product by Chiba Speciality Chemicals Inc.), were mixed to manufacture an ionizing radiation curing resin composition (a). The surface free energy of the ionizing radiation curing resin composition (a) was measured by the Wilhelmy method and found to be 42.6 mN/m. 0.5 weight parts of amino-modified silicone oil "KF857" (trade name; product by Shin-Etsu Chemical Co., Ltd.), whereof the value of the surface free energy measured by the Wilhelmy method was 20.7 mN/m was added to the ionizing radiation curing resin composition (a) as the compound (b) of low surface free energy, and the mixture was diluted by toluene to a solids concentration of 5 weight % so as to obtain a curing mixture. This curing mixture was coated to a thickness of 20 μm onto a PET film (Toyobo Co., Ltd.) having a thickness of 125 μm by a bar coater, and toluene was allowed to evaporate to obtain a film wherein the curing mixture was uniformly coated to a thickness of 1 μm on the PET film. The film obtained was divided into two parts whereof one part was irradiated by ultraviolet radiation by a high pressure mercury lamp in the atmosphere, and the other part was irradiated in water. The contact angle with various solvents was measured by a contact angle meter (Kyowa Interface Science Co., LTD.) to evaluate the surface properties. The results are shown in Table 1.

TABLE 1

| | Solvent | | | |
|---|---|---|---|---|
| Curing environment | Water | Ethylene glycol | Dipropylene glycol | Toluene |
| Atmosphere | 104° | 81° | 59° | 25° |
| Water | 61° | 34° | 0° | 0° |

Surface free energy of solvents, $\gamma_L$
Water: 72.8 mN/m ($\gamma_L{}^a$: 29.1 mN/m, $\gamma_L{}^b$: 1.3 mN/m, $\gamma_L{}^c$: 42.4 mN/m)
Ethylene glycol: 47.7 mN/m ($\gamma_L{}^a$: 30.1 mN/m, $\gamma_L{}^b$: 0 mN/m, $\gamma_L{}^c$: 17.6 mN/m)
Dipropylene glycol: 33.9 mN/m ($\gamma_L{}^a$: 29.4 mN/m, $\gamma_L{}^b$: 0 mN/m, $\gamma_L{}^c$: 4.5 mN/m)
Toluene: 27.9 mN/m ($\gamma_L{}^a$: 27.9 mN/m, $\gamma_L{}^b$: 0 mN/m, $\gamma_L{}^c$: 0 mN/m)
(All values at 20° C. From Journal of Adhesion, 8,131 (1972).

From the results of Table 1, the surface free energies when curing was performed in the atmosphere and when it was performed in water were respectively computed to be 21.5 mN/m and 40.2 mN/m. From this, it was found that a surface of different surface free energy from that obtained by curing in the atmosphere, was obtained by curing in water.

Comparative Example 1

60 weight parts of dipentaerythrytol hexa-acrylate "KAYARAD DPHA" (trade name; product by NIPPON KAYAKU CO., LTD.,), 40 weight parts of ethylene oxide-modified triacrylic isocyanurate "Aronix M-315" (trade name; product by TOAGOSEI CO., LTD.), 1 weight part of 2,4-diethylthioxanthone "KAYACURE DETX-S" (trade name; product by NIPPON KAYAKU CO., LTD.,) and 3 weight parts of 2-methyl-1-[4-(methylthio) phenyl]-2-morpholino propane-1-one "Irgacure 907" (trade name; product by Chiba Speciality Chemicals Inc.), were mixed to manufacture an ionizing radiation curing resin composition (a). The surface free energy of the ionizing radiation curing resin composition (a) was measured by the Wilhelmy method and found to be 42.6 mN/m. The ionizing radiation curing resin composition (a) was diluted by toluene to a solids concentration of 5 weight % so as to obtain a curing mixture. This curing mixture was coated to a thickness of 20 μm onto a PET film (Toyobo Co., Ltd.) having a thickness of 125 μm by a bar coater, and toluene was allowed to evaporate to obtain a film wherein the curing mixture was uniformly coated to a thickness of 1 μm on the PET film. The film obtained was divided into two parts whereof one part was irradiated by ultraviolet radiation by a high pressure mercury lamp in the atmosphere, and the other part was irradiated in water. The contact angle with various solvents was measured by a contact angle meter (Kyowa Interface Science Co., LTD.) to evaluate the surface properties. The results are shown in Table 2.

TABLE 2

| | Solvent | | | |
|---|---|---|---|---|
| Curing environment | Water | Ethylene glycol | Dipropylene glycol | Toluene |
| Atmosphere | 76° | 40° | 0° | 0° |
| Water | 68° | 30° | 0° | 0° |

Surface free energy of solvents, $\gamma_L$
Water: 72.8 mN/m ($\gamma_L{}^a$: 29.1 mN/m, $\gamma_L{}^b$: 1.3 mN/m, $\gamma_L{}^c$: 42.4 mN/m)
Ethylene glycol: 47.7 mN/m ($\gamma_L{}^a$: 30.1 mN/m, $\gamma_L{}^b$: 0 mN/m, $\gamma_L{}^c$: 17.6 mN/m)
Dipropylene glycol: 33.9 mN/m ($\gamma_L{}^a$: 29.4 mN/m, $\gamma_L{}^b$: 0 mN/m, $\gamma_L{}^c$: 4.5 mN/m)
Toluene: 27.9 mN/m ($\gamma_L{}^a$: 27.9 mN/m, $\gamma_L{}^b$: 0 mN/m, $\gamma_L{}^c$: 0 mN/m)
(All values at 20° C. From Journal of Adhesion, 8,131 (1972).

From the results of Table 2, the surface free energies when curing was performed in the atmosphere and when it was performed in water were respectively computed to be 39.6 mN/m and 42.3 mN/m. Therefore, the curing mixture to which the compound (b) of low surface free energy was not added, did not show different surface free energies even if it was cured in different environments.

Example 2

100 weight parts of pentaerythrytol triacrylate "Aronix M-305" (trade name; product by TOAGOSEI CO., LTD.) and 3 weight parts of 1-hydroxy-1-cyclohexyl-phenyl-ketone "Irgacure 184" (trade name; product by Chiba Speciality Chemicals Inc.), were mixed to manufacture an ionizing radiation curing resin composition (a). The surface free energy of the ionizing radiation curing resin composition (a) was measured by the Wilhelmy method and found to be 46.8 mN/m. 1 weight part of a fluorine block copolymer "Modiper F-200" (trade name; product by NOF CORPORATION), whereof the value of the surface free energy measured by the Wilhelmy method was 18.6 mN/m, was added to the ionizing radiation curing resin composition (a) as the compound (b) of low surface free energy, and the mixture was diluted by methylethylketone to a solids concentration of 10 weight % so as to obtain a curing mixture. This curing mixture was coated to a thickness of 10 μm onto a PET film (Toyobo Co., Ltd.) having a thickness of 125 μm by a bar coater, and methylethylketone was allowed to evaporate to obtain a film wherein the curing mixture was uniformly coated to a thickness of 1 μm on the PET film. The film obtained was irradiated by ultraviolet radiation using a high pressure mercury lamp in the atmosphere, using a photomask of line width 0.5 mm and pitch 1 mm, the photomask was removed, the film was immersed in water, and likewise irradiated by ultraviolet radiation with the high pressure mercury lamp. The film obtained by the above process was coated with PS plate offset UV curing ink "FD Karton" (trade name; product by TOYO INK MFG. CO., LTD.) to a thickness of 3 μm. The surface was coated by the UV curing ink only in the region cured in water without coating the UV curing ink on the region cured in the atmosphere, and an ink stripe having a width of 0.5 mm was thereby formed. The surface free energy was computed to be 20.3 mN/m in the atmosphere and 52.3 mN/m in water.

Comparative Example 2

100 weight parts of pentaerythrytol triacrylate "Aronix M-305" (trade name; product by TOAGOSEI CO., LTD.) and 3 weight parts of 1-hydroxy-1-cyclohexyl-phenyl-ketone "Irgacure 184" (trade name; product by Chiba Speciality Chemicals Inc.), were mixed to manufacture an ionizing radiation curing resin composition (a). The surface free energy of the ionizing radiation curing resin composition (a) was measured by the Wilhelmy method and found to be 46.8 mN/m. The composition was diluted by methylethylketone to a solids concentration of 10 weight % so as to obtain a curing mixture. This curing mixture was coated to a thickness of 10 μm onto a PET film (Toyobo Co., Ltd.) having a thickness of 125 μm by a bar coater, and methylethylketone was allowed to evaporate to obtain a film wherein the curing mixture was uniformly coated to a thickness of 1 μm on the PET film. The film obtained was irradiated by ultraviolet radiation using a high pressure mercury lamp in the atmosphere using a photomask of line width 0.5 mm and pitch 1 mm, the photomask was removed, the film was immersed in water, and likewise irradiated by ultraviolet radiation with the high pressure mercury lamp. The film obtained by the above process was coated with PS plate offset UV curing ink "FD Karton" (trade name; product by TOYO INK MFG. CO., LTD.) to a thickness of 3 μm. The surface was painted by the UV curing ink in both the region cured in the atmosphere and the region cured in water, but an ink stripe having a width of 0.5 mm could not be formed. The surface free energy was computed to be 51.2 mN/m in the atmosphere and 52.3 mN/m in water.

According to this invention, by curing the curing mixture wherein the compound (b) of low surface free energy was added to the ionizing radiation curing resin composition (a) in contact with media of different surface free energies, a surface of high surface free energy and a surface of low surface free energy could both be obtained.

What is claimed is:

1. A method of curing a mixture, comprising:
    curing at least part of a mixture comprising
        0.01–10 weight parts of a compound (b) based on 100 weight parts of an ionizing radiation curing resin composition (a)
        by irradiating with ionizing radiation while said mixture is in contact with a medium having a higher surface free energy than that of said ionizing radiation curing resin composition (a);
    wherein said compound (b) has a surface free energy of not more than 25 mN/m; and
    wherein said ionizing radiation curing resin composition (a) has a surface free energy of at least 30 mN/m.

2. The method according to claim 1, wherein said medium having a higher surface free energy than that of said ionizing radiation resin curing composition (a), is water.

3. The method according to claim 1, wherein said compound (b) is selected from the group consisting of a silicon-containing polymer, an alkoxysilane, and a fluorine-containing polymer.

4. The method according to claim 1, wherein said mixture further comprises an organic solvent selected from the group consisting of acetone, ethanol, methanol, isopropyl alcohol, hexane, ethyl acetate, chloroform, carbon tetrachloride, tetrahydrofuran, diethyl ether, methyl ethyl ketone, toluene, benzene and mixtures thereof.

5. A method of modifying a surface, comprising:
    coating a mixture comprising
        0.01–10 weight parts of a compound (b) based on 100 weight parts of an ionizing radiation curing resin composition (a)
        on a surface of a substrate;
    partially curing said mixture by irradiating with ionizing radiation while said mixture is in contact with a medium having a lower surface free energy than that of said compound (b); and
    curing a remaining, uncured part by irradiating with ionizing radiation while said mixture is in contact with a medium having a higher surface free energy than that of said ionizing radiation curing resin composition (a);
    wherein said compound (b) has a surface free energy of not more than 25 mN/m and;
    wherein said ionizing radiation curing resin composition (a) has a surface free energy of at least 30 mN/m.

6. The method according to claim 5, wherein, after curing, the surface free energy of a part of said mixture that was cured while in contact with a medium having a higher surface free energy than that of said ionizing radiation curing resin composition (a), is at least 5 mN/m higher than the part that was cured by irradiating while in contact with a medium having a lower surface free energy than that of said compound (b).

7. The method according to claim 5, wherein the medium having a lower surface free energy than that of said compound (b), is the atmosphere.

8. The method according to claim 5, wherein said medium having a higher surface free energy than that of said ionizing radiation curing resin composition (a), is water.

9. A method of modifying a surface, comprising:
    coating a mixture comprising
        0.01–10 weight parts of a compound (b) based on 100 weight parts of an ionizing radiation curing resin composition (a)
        on a surface of a substrate;
    partially curing said mixture by irradiating with ionizing radiation while said mixture is in contact with a medium having a higher surface free energy than that of said ionizing radiation curing resin composition (a); and
    curing a remaining, uncured part by irradiating with ionizing radiation while said mixture is in contact with a medium having a lower surface free energy than that of said compound (b);
    wherein said compound (b) has a surface free energy of not more than 25 mN/m; and
    wherein said ionizing radiation curing resin composition (a) has a surface free energy of at least 30 mN/m.

10. The method according to claim 9, wherein the medium having a lower surface free energy than that of said compound (b), is the atmosphere.

11. The method according to claim 9, wherein said medium having a higher surface free energy than that of said ionizing radiation curing resin composition (a), is water.

12. The method according to claim 4, wherein, after curing, the surface free energy of a part of said mixture that was cured while in contact with a medium having a higher surface free energy than that of said ionizing radiation curing resin composition (a), is at least 5 mN/m higher than the part that was cured by irradiating while in contact with a medium having a lower surface free energy than that of said compound (b).

13. A method of modifying a surface, comprising:
    coating a mixture comprising
        0.01–10 weight parts of a compound (b) based on 100 weight parts of an ionizing radiation curing resin composition (a)
        on a surface of a substrate;
    partially adhering a medium having a higher surface free energy than that of the ionizing radiation curing resin composition (a) to said mixture on the surface of the substrate; and curing said mixture by irradiating with ionizing radiation while said mixture is in contact with a medium having a lower surface free energy than that of said compound (b);

wherein said compound (b) has a surface free energy of not more than 25 mN/m; and wherein said ionizing radiation curing resin composition (a) has a surface free energy of at leapt 30 mN/m.

14. The method according to claim 13, wherein said medium having a higher surface free energy than that of said ionizing radiation curing resin composition (a), is water.

15. The method according to claim 13, wherein, after curing, the surface free energy of a part to which a medium having a higher surface free energy than that of said ionizing radiation curing resin composition (a) was adhered, is at least 5 mN/m higher than that of a part to which said medium was not adhered.

16. The method according to claim 13, wherein the medium having a lower surface free energy than that of said compound (b), is the atmosphere.

* * * * *